Dec. 23, 1969  TADAOKI YAMASHITA ET AL  3,485,766
THERMO-LUMINESCENCE TYPE RADIATION DOSIMETER
Filed Feb. 27, 1967  2 Sheets-Sheet 2

United States Patent Office 3,485,766
Patented Dec. 23, 1969

3,485,766
THERMO-LUMINESCENCE TYPE RADIATION DOSIMETER
Tadaoki Yamashita, Hirakata-shi, Kunio Sakai, Neyagawa-shi, Naohiro Nada, Nishinomiya-shi, and Saburo Kitamura, Kyoto, Japan, assignors to Matsushita Electric Industrial Co., Ltd., Osaka, Japan, a corporation of Japan
Filed Feb. 27, 1967, Ser. No. 618,592
Int. Cl. F21k 2/04; C09k 3/00, 1/22
U.S. Cl. 252—301.1                        5 Claims

ABSTRACT OF THE DISCLOSURE

Radiation responsive means and elements for a thermo-luminescence type dosimeter in which said means comprising a micro-crystalline consisting of calcium sulfate as a main material, with the addition of manganese and at least one other impurity elements. The impurity elements are lead, nickel, cobalt, zinc, cadmium, lithium, beryllium, sodium, thorium, zirconium, rhenium or tungsten. They are preferably composed of 1–5 mol percent of manganese and 0.05–0.5 mol percent lead and remaining $CaSO_4$. In combination with other elements responsible to neutron dosage, such as lithium flouride, both neutron dosage and ionization radiation dosage can be measured.

---

This invention relates to a thermo-luminescence type radiation dosimeter. More particularly, it relates to parts of said dosimeter and combination thereof which allow simultaneously improving the characteristics of sensitivity, reliability, retention of radiation energy and handiness. It also relates to a method for manufacturing the same.

In a thermo-luminescent dosimeter, it has heretofore been a practice to use, as the main materials, calcium fluoride or lithium flouride having thermo-luminescence. These are more excellent in many characteristics than a film badge using a photographic emulsion sensitive to radiation or a luminescent glass dosimeter, particularly the sensitivity of these compounds is considered better by several times than the latter. Taking into consideration that a film badge and so on are used widely, it is true that these thermo-luminescence type dosimeters are not always so extremely or extraordinarily excellent with respect to sensitivity and handiness. For instance, in the case of a dosimeter using lithium fluoride, the minimum response is generally 10 milliroentgen, and even in the case of special scientific apparatus, measurement under 1 milliroentgen is impossible. Taking into consideration that the minimum response of a film badge is considered as much as 10 milliroentgen, it cannot be said that the thermoluminescence type is extremely excellent so far as sensitivity is concerned. On the other hand, the minimum response of irradiation dosage by natural radioactivity is about from 3 to 10 microroentgen, depending upon locality, its response is required about up to 10 microroentgen.

The other important characteristic required for the thermo-luminescent dosimeter is retention of irradiation dosage. Thermo-luminescent material keeps radiation energy in itself when it receives radiation, and, upon heating, it emits accumulated energy as luminescence. The accumulated energy is emitted slowly except at the temperature of zero degree (absolute). When the material is kept at room temperature, the energy disappears more or less but the extent of disappearing varies considerably with the material used.

The above mentioned lithium fluoride is excellent so far as this property is concerned. Besides fluoride, calcium sulfate is known as a material having one of the most excellent thermo-luminescent properties and a material having very excellent sensitivity was made by way of experiment. However, the material is poor in dose retention. Accumulated energy is reduced by half for two days, so that the material cannot be used for more than several hours.

As mentioned above, lithium fluoride is not sufficient in sensitivity and the calcium sulfate heretofore used has a weak point about dose retention. Accordingly there has been no dosimeter which meets all such requirements as mentioned.

It is therefore an object of this invention to provide a dosimeter having high sensitivity capable of detecting natural radioactivity and good retention of radiation energy. Another object of this invention is to provide a dosimeter having not only the above mentioned characteristics but also having reliability and handiness.

These and other objects and advantages of this invention will become apparent to those skilled in the art from a consideration of the following specification and claims.

This invention will further be described with reference to the accompanying drawings, in which.

In order to manufacture the material, calcium sulfate ($CaSO_4 \cdot 2H_2O$) of high purity and concentrated sulfuric acid purified by distillation are used as starting materials. Thus, calcium sulfate is dissolved in hot concentrated sulfuric acid whereby saturated sulfuric acid solution of calcium sulfate is prepared. Calcium sulfate is dissolved by about 8% or less in hot concentrated sulfuric acid. Solubility of calcium sulfate in concentrated sulfuric acid is almost constant at various temperatures, so the conventional method of recrystallization by lowering temperature cannot be applied for this purpose. But when saturated concentrated sulfuric acid solution is heated further and sulfuric acid is vaporized off, crystals of calcium sulfate ($CaSO_4$) are formed. The crystals have a size of about 0.1–5 mm. and if no impurity element except one hereinunder mentioned is added, luminescence does not appear. Addition of an impurity element to crystals is carried out by adding any effective impurity element to a concentrated sulfuric acid solution together with calcium sulfate. A portion of impurity ion in sulfuric acid solution is crystallized out in the crystals of calcium sulfate. The segregation rate of impurity ion to crystals of calcium sulfate from concentrated sulfuric acid varies according to kinds of impurity element, segregation velocity and concentration.

$$\text{Segregation constant} = \frac{\text{atomic concentration of impurity in calcium sulfate crystals}}{\text{atomic concentration of impurity ion in calcium sulfate in sulfuric acid}} \doteq 0.01-0.5$$

For instance, in the case of manganese, the segregation constant is about 0.1 to 0.2. Hot concentrated sulfuric acid can dissolve almost all compounds, so the addition of almost all cation impurities is possible by this process. For instance, in order to add metal impurity, metal oxide or its sulfate is dissolved in hot concentrated sulfuric acid. Such calcium sulfate doped with impurity has more or less thermo-luminescence, particularly manganese doped calcium sulfate has high thermo-luminescence and the peak of thermo-luminescence appears at the temperature of 100° C.

Figure 1:
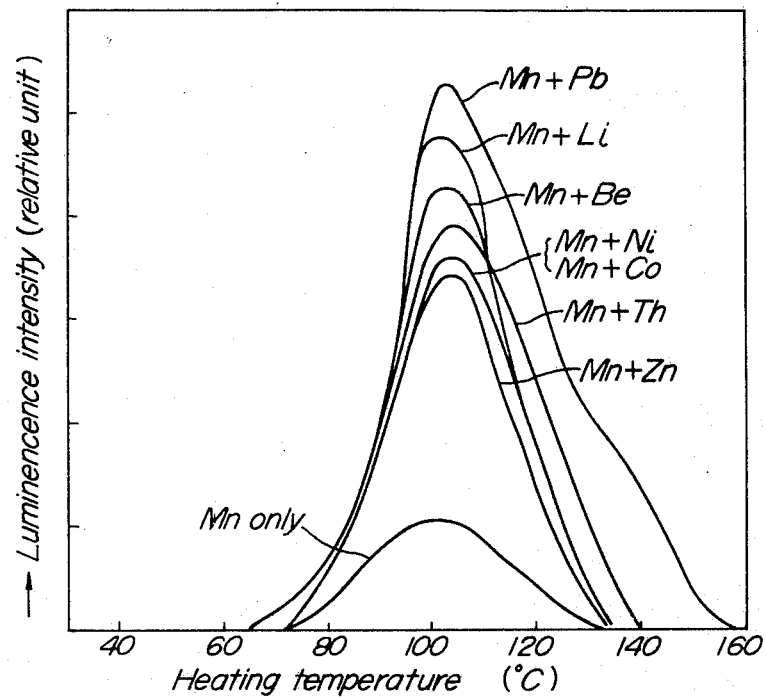
FIG. 1 shows curves illustrating a relation between the heating temperature and the intensity of thermoluminescence when calcium sulfate to which two kinds of impurities have been added is irradiated by gamma rays and then heated.

Anyhow, material having higher thermo-luminescence can be produced by adding other impurities together with manganese. FIG. 1 shows the relation between heating temperature and the intensity of thermo-luminescence when calcium sulfate containing two kinds of impurities (concentration of each of the impurities is 1 mol percent to calcium sulfate) is irradiated by gamma rays and then heated. The figure records the relative intensity of thermo-luminescence corresponding to temperature when the temperature of the material increases at a heating speed of 40° C. per minute. This relation curve is hereinafter referred to as the thermo-luminescent low curve. In this case, concentration of each of the impurities introduced is about from 0.01 to 1 atomic percent depending on the kind of impurity atom. As shown from this figure, luminescent intensity of calcium sulfate produced by dissolving 1 mol percent of manganese and 1 mol percent of other impurity ion is higher than that of calcium sulfate processed by only dissolving 1 mol percent of manganese. That is to say, the second doping element has a sensitization effect. The inventors have found that the second doping element cannot be allowed to be any element. Lead, nickel, cobalt, zinc, cadmium, beryllium and sodium give good results and also thorium, zirconium, rhenium, tungsten etc. have a sensitization effect. Inversely, iron, vanadium, etc. have the effect of decreasing thermo-luminescence. The above-mentioned concentration of two kinds of impurity element is in these cases when impurity doped calcium sulfate is processed by dissolving each 1 mol percent impurity ions to calcium ions in sulfuric acid, and when the concentration is increased, the effect of thermo-luminescence changes.

Figure 2:
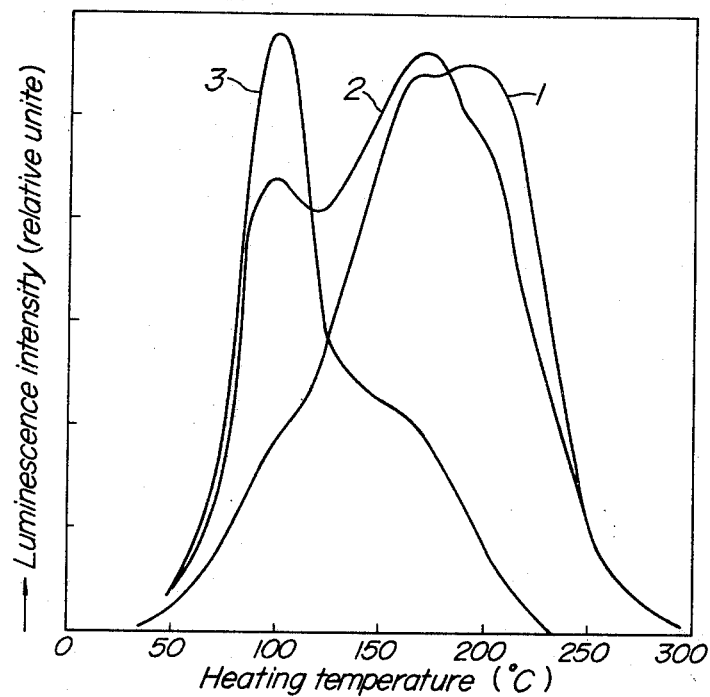
FIG. 2 shows curves illustrating the same relation as FIG. 1 of calcium sulfate to which manganese and lead have been added.

FIG. 2 shows the same relation curve as FIG. 1 in the case of calcium sulfate doped with lead and manganese and changing concentration of lead and manganese. In FIG. 2, curve 1 is a case wherein the concentration of lead and manganese in the crystals is 0.23% and 5% respectively. It must be noted that these are exact analytical values of the crystals thus processed, but not the dissolving concentration into sulfuric acid just before the manufacturing of the crystals. In this case, the dissolving concentration into sulfuric acid is to be from several to 10 times greater than the concentration in the crystals. As shown from this glow curve, the main thermo-luminescent glow peaks exist at the temperatures of 160° and 190° C. and the glow peak at the temperature of 100° C. is lower. When thermo-luminescence at the temperature of 160° and 190° C. is applied to dosimetry, the retention of irradiation energy is excellent and the rate of decreasing of accumulated energy is about 5% per week. The dose retention at 100° C. is poor, as mentioned above, so it is better to preheat the material to 110° C. in order to use only thermo-luminescence at higher temperature. When the doped impurity concentration changes slightly, such glow curve cannot be achieved. Generally when each of the concentrations of lead and manganese is less than the above-mentioned level, the intensity of thermo-luminescence at the temperature of 100° C. is increased as shown in curve 2 of FIG. 2 wherein the curve 2 of FIG. 2 shows the case of the doped concentration at 0.05% of lead and 1% of manganese. When the doped concentration of manganese and lead further decreases, the luminescence at the temperature of 100° C. grows stronger and the application to measurement becomes difficult. When the doped concentration of lead and manganese is higher than that of curve 1 in FIG. 2, the intensity of luminescence tends to decrease. Further when the doped concentration of one element of either lead or manganese is higher or lower than that of curve 1 in FIG. 2, the glow curve at the temperature of 100° C. is increased. The curve 3 in FIG. 2 is the case that the doped concentration is 0.03% of lead and 2% of manganese wherein the glow curve at the temperature of 100° C. is extraordinarily high.

From the tendency of the change of characteristics depending upon the doped impurity concentration as set forth above, it can be understood that the doped impurity concentration of lead and manganese must be appropriate. The optimum impurity concentration of calcium sulfate having good retention of irradiation energy and good thermoluminescence at the temperature between 160° and 190° C. is from 0.05 to 0.5 mol percent of lead and from 1 to 5 mol percent of manganese. Further it will be noted that the doped impurity concentration is the exact analytical value of micro crystals of calcium sulfate but when crystallinity is poor or when particle size of crystals are too small, the exact concentration cannot be obtained due to adsorption of the doped impurity on the crystal surface or entrainment thereof in the grain boundary. Consequently the optimum concentration may be larger than the above mentioned value.

The inventors have described the manufacturing process of the material of a dosimeter having high sensitivity and high retention by admixing more than two kinds of doped impurity into calcium sulfate. The material thus manufactured is further treated as follows whereby a part of dosimeter is moulded.

This micro-crystalline material must be washed thoroughly to remove any adsorbed sulfuric acid etc., and heated at the temperature of about 600°–700° C. for about one hour to evaporate and remove sulfuric acid and other adsorbed impurities. The treated material is usable as a dosimeter even in the form of micro-crystals. And also this treated material may be moulded if desired. The moulded material should be handy and meet a certain requirement for optical purposes.

The luminescent material is obtained as micro-crystals of a size of about 0.1–1 mm. When a part of dosimeter as a plate of 0.1–3 mm. thick is moulded, luminescence will have been absorbed in the part when it reaches the surface of the part since luminescence is scattered at the surface of micro-crystals. To prevent this effect and to improve the efficiency of luminescence of moulded part, the micro-crystals must be dispersed into the transparent material having refractive index as nearly equal that of the micro-crystals.

Figure 3:
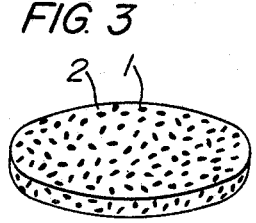
FIG. 3 shows a simplified perspective view of the material having dispersed micro crystals of calcium sulfate into polyfluoro resin.
Figure 4:
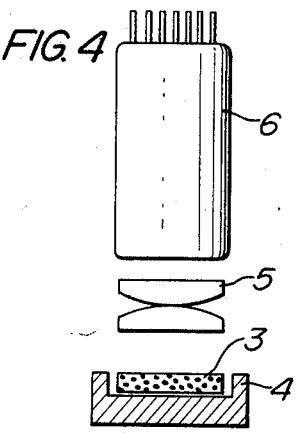
FIG. 4 shows a schematic view of optical system when the luminescent part of FIG. 3 is measured.

FIG. 3 shows an example of a moulded part of micro-crystals of calcium sulfate dispersed into a transparent resin, wherein 1 is the micro-crystals of calcium sulfate and 2 is the polyfluoro resin. The part may be moulded in various size according to its purposes, for example, 0.1–3 mm. in thickness and 1–10 cm.² in area. FIG. 4 schematically shows an optical system measuring the luminescence of this moulded part. In FIG. 4, 3 is the thermo-luminescent part dispersed into the above-mentioned resin, 4 is a metal heater improved with respect to reflectivity by chromium gilding or silver gilding on the surface. 5 is a condenser lens to collect luminescence of crystals of 1 and 6 is a photomultiplier for light detection. Luminescince irradiated from crystal 1 is passed to the surface without being scattered by the existence of resin 2. Irradiation is collected by lens 5 and detected by photomultiplier 6. Luminescence irradiated to the opposite side of lens is reflected by metal 4 and passed through luminescent part and sent to the lens.

To effect luminescent efficiency, it is necessary to provide high transparency of the luminescent part itself. The transparent index of the part must be at least 10%. Such a part is manufactured by the following process:

Polyfluoro resin having high heat resistance and high transmittance may be preferably used as a dispersing resin. In the case of polyfluoro resin, the heat resistance is higher in the order of poly-tetra-fluoro-ethylene, copolymer of tetra-fluoro-ethylene and hexa-fluoro-propylene, and poly-mono-chloro-tri-fluoro-ethylene; and the transmittance is higher in the order of copolymer of tetra-fluoro-ethylene and hexa-fluoro-propylene, poly-mono-chloro-tri-fluoro-ethylene and poly-tetra-fluoro-ethylene. Accordingly, in the polyfluoro resins for calcium sulfate characterised by measuring thermo-luminescence at above the temperature of 150° C., poly-tetra-fluoro-ethylene is best in heat resistance and copolymer of tetra-fluoro-ethylene and hexa-fluoro-propylene is best in transmittance. Therefore, in the case of a thin part less than 0.2 mm. in thickness, poly-tetra-fluoro-ethylene may be used and in the case of a relatively thick part copolymer of tetra-fluoro-ethylene and hexa-fluoro-propylene may be used.

To begin with, micro-crystals of calcium sulfate and powder of polyfluoro resin are provided. The size of particles of the two may preferably be the same and may be as small as about one-third of the thickness desired. When the particle size is too small, transmittance decreases, which shows that the method of moulding differs from the conventional mixing of plasticizer of resin. Then both materials are thoroughly admixed wherein the mixing proportion of resin to calcium sulfate may preferably be from 3:1 to 1:1 in volume. Then the admixture is heated; in the case of poly-tetra-fluoro-ethylene, the admixture is heated at the temperature of about 380° C., in the case of copolymer of tetra-fluoro-ethylene and hexa-fluoro-propylene up to 350° C. After the resin is softened and fused, admixture is moulded under compression. The proper compression pressure is generally 10–30 kg./cm.² By cooling and taking out from the mould, a product part is obtained.

It is noted that the copolymer of tetra-fluoro-ethylene and hexa-fluoro-propylene is difficult to crush, but the powder used in this process is large enough in size, so it is provided by mechanical crushing of solid resin, that is to say, it may be crushed by a polishing machine or by high speed agitation of resin pellets.

The following process may be used to manufacture relatively thin film: a dispersed aqueous solution of polyfluoro resin is provided and micro-crystals of calcium sulfate are added to the solution, which is agitated for mixing. It is then cast on the base metal plate, dried at the temperature of about 100° C., then heated to the fusion point of resin, backed and finally stripped off from the base metal.

Such burying of the material in the resin is not only effective on ease of handling and increase of luminescent efficiency, but also on saving of measuring time by improvement of thermal conduction of the parts.

As set forth above, a dosimeter having higher sensitivity than the conventional one or having high sensitivity and excellent retention of irradiation dosage can be obtained by the practice of this invention.

Figure 5A:
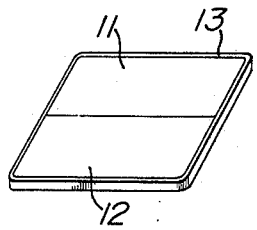
FIGS. 5a to 5c show a perspective view illustrating one embodiment of a dosimeter in which a part or parts of calcium sulfate system and a part of other system are combined.

The dosimeter according to this invention is excellent in sensibility to ionizing radiation and in the other characteristics, but has no sensitivity to neutron dose among various radiation. In the thermo-luminescence type dosimeter responsible to neutron dose, materials are limited and the corresponding materials are only lithium fluoride (LiF) and some compounds of boron. These materials respond not only to neutron but also to other ionizing radiation, but in many cases the actual neutron generated is accompanied with ionizing radiation such as gamma rays. Therefore neutron dose can only be obtained by measuring dosage gamma rays independently and deducting the dosage of gamma rays from total dosage. Thus, even when such lithium fluoride etc. are used, thermo-luminescent material responding only to ionizing radiation dosage is necessary. As above mentioned, calcium sulfate is not responsible to neutron dosage, and has high sensitivity to ionizing radiation dosage, so such calcium sulfate is effective as an auxiliary part in the measurement of neutron dose. FIG. 5(a) is an example of such dosimeter that makes it possible to measure neutron dosage by combining thermo-luminescent materials. At the same time, such dosimeter can measure ionizing radiation dosage at high sensibility. In FIG. 5(a), 11 is a calcium sulfate part, 12 is a part using lithium fluoride (LiF) using lithium having a mass number of 6, and 13 is a plastic case receiving these parts.

By this dosimeter combination can be used with excellent high sensibility and excellent high reliability with respect to gamma rays dosage. At the same time it is possible to measure neutron dosage with excellent high reliability, because the correction of gamma rays can be carried out reliably by using calcium sulfate.

There is a defect in thermo-luminescence type dosimeters. It is that the record of irradiated dose cannot remain in a dosimeter because all accumulated energy is removed completely when once heating the luminescent material before measurement. Therefore, when the dosimeter is once heated for a dose reading which fails, then the irradiation dose cannot be obtained. But the measurement of the irradiated dosage is an important problem affecting the human body, so any failure of reading cannot be allowed. This problem can be solved by using more than one dosimeter particularly as security should one fail in the reading or in other treatment.

Figure 5B:
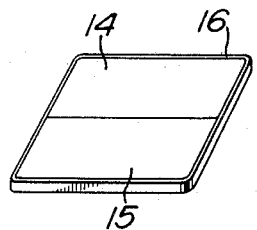
Figure 5C:
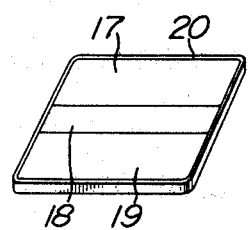

FIG. 5(b) shows a part including above mentioned parts of calcium sulfate 14 and 15 in a case. The part 14 in the case is used in ordinary measurement and the part 15 is used as supplemental measurement should reading fail. As this supplementary part need not always be of high sensibility, the above-mentioned part of lithium fluoride for neutron dosage may be used. By using lithium fluoride for two purposes: measurement of neutron dosage and for a supplementary part for ionizing radiation measurement dosage, the structure of dosimeter may be simplified. FIG. 5(c) shows a part consisting of calcium sulfate of high sensitivity 17, a supplementary part of calcium sulfate 18 and a part 19 for measuring neutron dosage received in one case. This part has the most high reliability.

What is claimed is:

1. A thermoluminescence type radiation dosimeter comprising thermoluminescent phosphor of calcium sulfate which is activated by impurity elements of manganese and at least one element selected from the group consisting of lead, nickel, cobalt, zinc, cadmium, lithium, beryllium, sodium, thorium, zirconium, rhenium and tungsten.

2. A thermoluminescence type radiation dosimeter according to claim 1, comprising a calcium sulfate thermoluminescent dosimeter and at least one supplemental thermoluminescent dosimeter used for supplemental measurement.

3. A thermoluminescence type radiation dosimeter comprising a thermoluminescent phosphor of calcium sulfate which is activated by 0.05–0.5 mol percent of lead and 1–5 mol percent of manganese as impurity elements.

4. A thermoluminescence type radiation dosimeter for measuring both ionizing radiation and neutron dosage, comprising a thermoluminescent dosimeter piece responding to ionizing radiation which consists of calcium sulfate, activated by impurity elements of manganese and at least one element selected from the group consisting of lead, nickel, cobalt, zinc, cadmium, lithium, beryllium, sodium, thorium, zirconium, rhenium and tungsten, and a thermoluminescent dosimeter piece responding to neutron dosage which consists of compounds selected from the group including lithium and boron.

5. A thermoluminescence type radiation dosimeter consisting of a calcium sulfate thermoluminescent phosphor activated by impurity elements of manganese and at least one element selected from the group consisting of lead, nickel, cobalt, zinc, cadmium, lithium, beryllium, sodium, thorium, zirconium, rhenium and tungsten, embedded in fluoro-ethylene polymers.

References Cited

UNITED STATES PATENTS

| | | | |
|---|---|---|---|
| 3,141,973 | 7/1964 | Heins et al. | 252—301.4 X |
| 3,203,899 | 8/1965 | Fisher | 252—301.4 X |
| 3,239,665 | 3/1966 | Blase et al. | 250—71.5 |
| 3,282,855 | 11/1966 | Palmer et al. | 252—301.4 |
| 3,303,043 | 2/1967 | Halpaap et al. | 252—301.4 X |
| 3,342,745 | 9/1967 | Hofstadter | 252—301.4 |
| 3,376,416 | 4/1968 | Rutland et al. | 250—71.5 |

BENJAMIN R. PADGETT, Primary Examiner

MELVIN J. SCOLNICK, Assistant Examiner

U.S. Cl. X.R.

252—71.5, 301.3, 301.4, 301.5, 301.6